US010983356B2

(12) United States Patent
Alexander et al.

(10) Patent No.: US 10,983,356 B2
(45) Date of Patent: *Apr. 20, 2021

(54) SYSTEMS, DEVICES, AND METHODS FOR OPTICAL WAVEGUIDES

(71) Applicant: GOOGLE LLC, Mountain View, CA (US)

(72) Inventors: Stefan Alexander, Elmira (CA); Douglas Raymond Dykaar, Waterloo (CA); John Otto Vieth, Waterloo (CA); Timothy Paul Bodiya, Toronto (CA)

(73) Assignee: GOOGLE LLC, Mountain View, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 16/020,007

(22) Filed: Jun. 27, 2018

(65) Prior Publication Data

US 2018/0373045 A1     Dec. 27, 2018

Related U.S. Application Data

(60) Provisional application No. 62/525,601, filed on Jun. 27, 2017.

(51) Int. Cl.
*G02B 27/01* (2006.01)
*F21V 8/00* (2006.01)
*G02B 26/10* (2006.01)

(52) U.S. Cl.
CPC ......... *G02B 27/0176* (2013.01); *G02B 6/005* (2013.01); *G02B 6/0023* (2013.01);
(Continued)

(58) Field of Classification Search
None
See application file for complete search history.

(56) References Cited

U.S. PATENT DOCUMENTS 10,146,054 B2    12/2018   Martinez et al.
2016/0349514 A1  12/2016   Alexander
(Continued)

OTHER PUBLICATIONS

Non-Final Office Action dated Apr. 16, 2020 for U.S. Appl. No. 16/020,000, 15 pages.
(Continued)

*Primary Examiner* — Jennifer D. Carruth

(57) ABSTRACT

Systems, devices, and methods for optical waveguides that are well-suited for use in wearable heads-up displays (WHUDs) are described. An optical waveguide includes a volume of optically transparent material, a first holographic optical element (HOE) and a second holographic optical element, wherein the first HOE and the second HOE are carried by the volume of optically transparent material, and the first HOE is positioned across a width of the volume of optically transparent material from the second HOE. Light enters the optical waveguide and is propagated down a length of the waveguide by reflection between the first HOE and the second HOE. Propagation of the light within the optical waveguide does not require total internal reflection. The optical waveguide may include means to in-couple the light into the waveguide and means to out-couple the light from the waveguide. WHUDs that employ such optical waveguides are also described.

20 Claims, 8 Drawing Sheets

(52) U.S. Cl.
CPC ....... *G02B 26/105* (2013.01); *G02B 27/0172* (2013.01); *G02B 2027/013* (2013.01); *G02B 2027/015* (2013.01); *G02B 2027/0174* (2013.01); *G02B 2027/0178* (2013.01)

(56) References Cited

U.S. PATENT DOCUMENTS

| | | | |
|---|---|---|---|
| 2017/0219829 A1* | 8/2017 | Bailey | G02B 27/0172 |
| 2018/0074316 A1 | 3/2018 | Burkhardet | |
| 2018/0120563 A1* | 5/2018 | Kollin | G02B 5/32 |
| 2018/0321736 A1 | 11/2018 | Masson | |
| 2018/0373043 A1 | 12/2018 | Alexander et al. | |
| 2018/0373044 A1 | 12/2018 | Alexander et al. | |
| 2018/0373046 A1 | 12/2018 | Alexander et al. | |

OTHER PUBLICATIONS

Non-Final Office Action dated Apr. 16, 2020 for U.S. Appl. No. 16/020,002, 14 pages.
Notice of Allowance dated Aug. 24, 2020 for U.S. Appl. No. 16/020,002, 10 pages.
Final Office Action dated Aug. 18, 2020 for U.S. Appl. No. 16/020,011, 14 pages.
Non-Final Office Action dated Feb. 10, 2020 for U.S. Appl. No. 16/020,011, 10 pages.

* cited by examiner

SYSTEMS, DEVICES, AND METHODS FOR OPTICAL WAVEGUIDES

TECHNICAL FIELD

The present systems, devices, and methods generally relate to optical waveguides, and particularly relate to systems, devices, and methods that employ such optical waveguides in wearable heads-up displays.

BACKGROUND

Description of the Related Art

Optical Waveguides

A majority of currently available wearable heads-up displays employ optical waveguide systems in the transparent combiner. A conventional optical waveguide operates under the principle of total internal reflection (TIR). TIR occurs when light remains in a first medium upon incidence at a boundary with a second medium because the refractive index of the first medium is greater than the refractive index of the second medium and the angle of incidence of the light at the boundary is above a specific critical angle that is a function of those refractive indices. Optical waveguides employed in wearable heads-up displays like those mentioned above consist of rectangular prisms of material with a higher refractive index than the surrounding medium, usually air (Google Glass®, Optinvent Ora®, Epson Moverio®) or a planar lens (Microsoft Hololens®). Light input into the prism will propagate along the length of the prism as long as the light continues to be incident at boundaries between the prism and the surrounding medium at an angle above the critical angle. Optical waveguides employ in-coupling and out-coupling elements to ensure that light follows a specific path along the waveguide and then exits the waveguide at a specific location in order to create a desired image or pattern.

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. The "combiner" component of a wearable heads-up display is the physical structure where display light and environmental light merge as one within the user's field of view. The combiner of a wearable heads-up display is typically transparent to environmental light but includes some optical routing mechanism to direct display light into the user's field of view.

Examples of wearable heads-up displays include: the Google Glass®, the Optinvent Ora®, the Epson Moverio®, and the Microsoft Hololens® just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ bulky planar waveguides in planar transparent combiners and, as a result, appear very unnatural on a user's face compared to the more sleek and streamlined look of typical eyeglass and sunglass lenses. There is a need in the art for smaller optical waveguides to integrate into wearable heads-up displays in order to achieve the inconspicuous form factor and fashion appeal expected of the eyeglass frame industry.

BRIEF SUMMARY

An optical waveguide may be summarized as including: a volume of optically transparent material having a first longitudinal surface and a second longitudinal surface, the second longitudinal surface opposite the first longitudinal surface across a width of the volume of optically transparent material; a first holographic optical element ("HOE") carried by the volume of optically transparent material at or adjacent the first longitudinal surface; a second HOE carried by the volume of optically transparent material at or adjacent the second longitudinal surface, wherein the light signals that enter the volume of optically transparent material are sequentially reflected by and between the first HOE and the second HOE to propagate along a length of the optical waveguide; an in-coupling region; and an out-coupling region. The volume of optically transparent material, the first HOE, and the second HOE may be curved.

The first HOE and the second HOE may cover portions of the first longitudinal surface and the second longitudinal surface, respectively, and the portion covered may be equal to or greater than 50%.

The in-coupling region may include at least of portion of an element selected from the group consisting of: the first HOE, the second HOE, and a dedicated in-coupling element. When light signals are in-coupled into the optical waveguide by a dedicated in-coupling element, the dedicated in-coupling element may be selected from a group consisting of: a hologram, a holographic optical element, a volume diffraction grating, a surface relief diffraction grating, a transmission grating, and a reflection grating. Light signals may be in-coupled by the in-coupling region according to at least one property selected from a group consisting of: a wavelength of a light signal, an angle of incidence of a light signal on the in-coupling region, and a location of incidence of a light signal on the in-coupling region.

The out-coupling region may include at least a portion of an element selected from the group consisting of: the first HOE, the second HOE, and a dedicated out-coupling element. When light signals are out-coupled from the optical waveguide by the dedicated out-coupling element, the dedicated out-coupling element may be selected from a group consisting of: a hologram, a holographic optical element, a volume diffraction grating, a surface relief diffraction grating, a transmission grating, and a reflection grating. Light signals may be out-coupled by the out-coupling region according to at least one property selected from a group consisting of: a wavelength of a light signal, an angle of incidence of a light signal on the out-coupling region, and a location of incidence of a light signal on the out-coupling region The first HOE may comprise N holograms, where N is an integer greater than 1 and wherein each of the N holograms in the first HOE is responsive to light in a respective one of N distinct wavebands, and the second HOE may comprise N holograms, wherein each of the N holograms in the second HOE is responsive to light in a respective one of the N distinct wavebands. The first HOE may include: a first hologram responsive to light in a first waveband and unresponsive to light outside the first waveband; a second hologram responsive to light in a second waveband and unresponsive to light outside the second waveband; and a third hologram responsive to light in a third waveband and unresponsive to light outside the third waveband, wherein the first waveband, the second waveband, and the third waveband are all distinct and non-overlapping; and the second HOE may include: a fourth hologram responsive to light in the first waveband and unresponsive to light outside the first waveband; a fifth hologram responsive to light in the second waveband and unresponsive to light outside the second waveband; and a sixth hologram responsive to light in the third waveband and unresponsive to light outside the third waveband.

A method of operating an optical waveguide comprising: a volume of optically transparent material having a first longitudinal surface and a longitudinal second surface, the first longitudinal surface positioned opposite the second longitudinal surface across a width of the volume of optically transparent material, a first HOE carried by the volume of optically transparent material on or adjacent the first longitudinal surface, a second HOE carried by the volume of optically transparent second longitudinal surface, an in-coupling region, and an out-coupling region, may be summarized as including: receiving light signals by the optical waveguide; in-coupling the light signals by the in-coupling region; propagating the light signals along a length of the volume of optically transparent material by reflection by and between the first HOE and the second HOE; and outputting light signals by the out-coupling region.

A wearable heads-up display (WHUD) may be summarized as including: a support structure that in use is worn on a head of a user, the support structure having the shape and appearance of an eyeglass frame; a projector to generate light signals, the projector comprising at least one light source; and an optical waveguide comprising: a volume of optically transparent material; a first holographic optical element ("HOE") carried by the volume of optically transparent material; a second HOE carried by the volume of optically transparent material and positioned opposite the first HOE across a width of the volume of optically transparent material, wherein light signals from the projector that enter the volume of optically transparent material are sequentially reflected by and between the first HOE and the second HOE to propagate along a length of the optical waveguide; an in-coupling region; and an out-coupling region. The first HOE and the second HOE may span the entire length of the volume of optically transparent material. The first HOE and the second HOE may span only an active region of the volume of optically transparent material.

The volume of optically transparent material may be curved. The first HOE and the second HOE may be curved.

The WHUD may further include an eyeglass lens carried by the support structure. The optical waveguide may be carried by the eyeglass lens. The eyeglass lens may be a curved prescription eyeglass lens and the optical waveguide may be carried by the curved prescription eyeglass lens, wherein a curvature of the optical waveguide corresponds to the prescription curvature of the prescription eyeglass lens.

The volume of optically transparent material may have the shape and appearance of an eyeglass lens and may be carried by the support structure.

The in-coupling region may include at least a portion of an element selected from a group consisting of: the first HOE, the second HOE, and a dedicated in-coupling element. When light signals are in-coupled by a dedicated in-coupling element, the dedicated in-coupling element may be selected from a group consisting of: a hologram, a holographic optical element, a volume diffraction grating, a surface relief diffraction grating, a transmission grating, and a reflection grating. Light signals may be in-coupled according to at least one property selected from a group consisting of: a wavelength of a light signal, an angle of incidence of a light signal on the in-coupling region, and a location of incidence of a light signal on the in-coupling region.

The out-coupling region may include at least a portion of an element selected from a group consisting of: the first HOE, the second HOE, and a dedicated out-coupling element. When light signals are out-coupled from the optical waveguide by a dedicated out-coupling element, the dedicated out-coupling element may be selected from a group consisting of: a hologram, a holographic optical element, a volume diffraction grating, a surface relief diffraction grating, a transmission grating, and a reflection grating. Light signals may be out-coupled according to at least one property selected from a group consisting of: a wavelength of a light signal, an angle of incidence of a light signal on the out-coupling region, and a location of incidence of a light signal on the out-coupling region.

The first HOE may include N holograms, where N is an integer greater than 1 and wherein each of the N holograms in the first HOE is responsive to light in a respective one of N distinct wavebands, and the second HOE may include N holograms, wherein each of the N holograms in the second HOE is responsive to light in a respective one of the N distinct wavebands. The first HOE may include: a first hologram responsive to light in a first waveband and unresponsive to light outside the first waveband; a second hologram responsive to light in a second waveband and unresponsive to light outside the second waveband; and a third hologram responsive to light in a third waveband and unresponsive to light outside the third waveband, wherein the first waveband, the second waveband, and the third waveband are all distinct and non-overlapping; and the second HOE may include: a fourth hologram responsive to light in the first waveband and unresponsive to light outside the first waveband; a fifth hologram responsive to light in the second waveband and unresponsive to light outside the second waveband; and a sixth hologram responsive to light in the third waveband and unresponsive to light outside the third waveband.

The light source may include at least one laser diode.

The projector may further includes a controllable mirror to controllably direct the light signals towards the optical waveguide.

A method of operating a wearable heads-up display comprising a support structure that in use is worn on the head of a user, a projector with at least one light source, and an optical waveguide including a volume of optically transparent material, a first HOE carried by the volume of optically transparent material, a second HOE carried by the volume of optically transparent material, an in-coupling region, and an out-coupling region, may be summarized as including: generating light signals by the at least one light source; receiving the light signals by the optical waveguide; in-coupling the light signals into the optical waveguide by the in-coupling region; propagating the light signals down a length of the volume of optically transparent material by reflection by and between the first HOE and the second HOE; and outputting the light signals towards an eye of the user by the out-coupling region. When the projector further includes a controllable mirror, the method may further include: directing the light signals towards the optical waveguide by the controllable mirror.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1A:
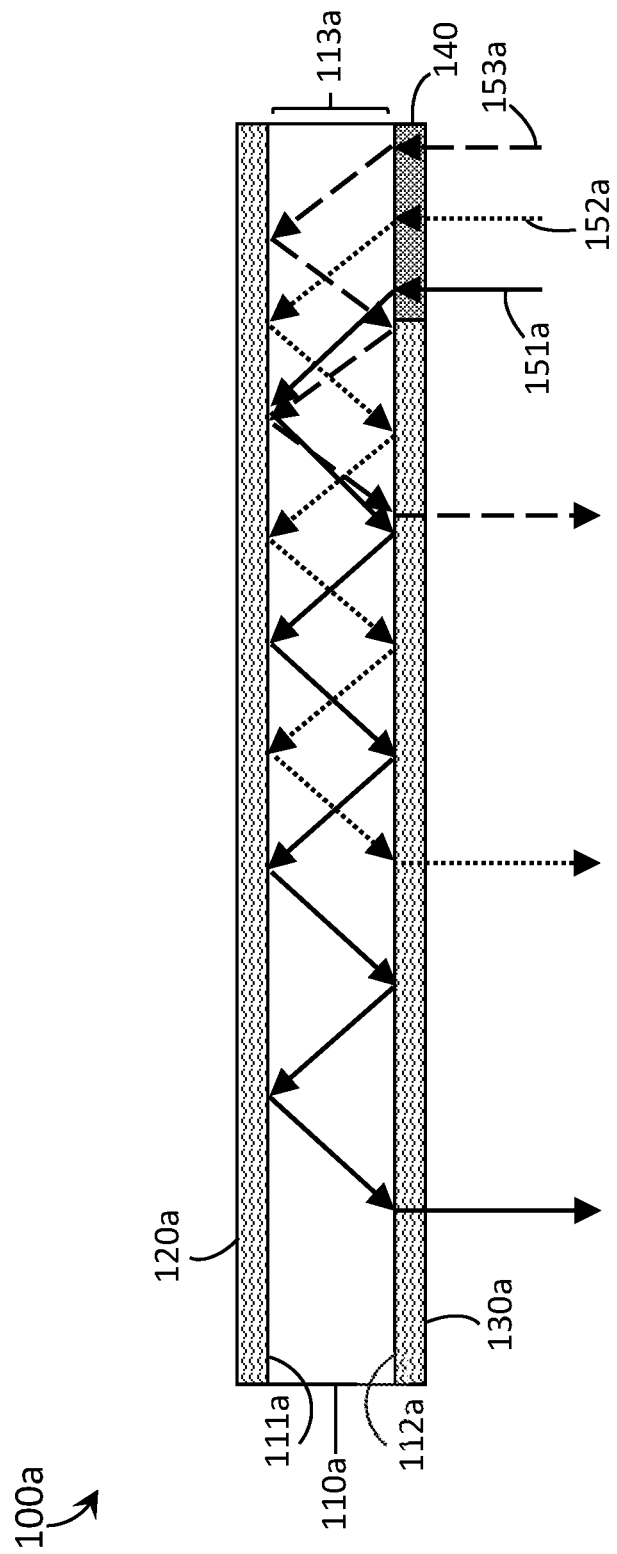
FIG. 1A is a schematic diagram of an optical waveguide in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Throughout this specification and the appended claims, the term "carries" and variants such as carried by are generally used to refer to a physical coupling between two objects. The physical coupling may be direct physical coupling (i.e., with direct physical contact between the two objects) or indirect physical coupling mediated by one or more additional objects. Thus the term carries and variants such as "carried by" are meant to generally encompass all manner of direct and indirect physical coupling.

The headings and Abstract of the Disclosure provided herein are for convenience only and do not interpret the scope or meaning of the embodiments.

The various embodiments described herein provide systems, devices, and methods for curved eyeglass lenses with waveguides integrated therewith. Such are particularly well-suited for use as or in the transparent combiner of wearable heads-up displays ("WHUDs") in order to enable the WHUDs to adopt more aesthetically-pleasing styles and, in some implementations, to enable the WHUDs to include prescription eyeglass lenses. Examples of WHUD systems, devices, and methods that are particularly well-suited for use in conjunction with the present systems, devices, and methods for curved lenses with waveguides are described in, for example, U.S. Non-Provisional patent application Ser. No. 15/167,458, U.S. Non-Provisional patent application Ser. No. 15/167,472, and U.S. Non-Provisional patent application Ser. No. 15/167,484.

Optical waveguides which operate under the principle of total internal reflection require that the waveguide be bounded by a material of a lesser refractive index than the material of the waveguide. If the waveguide is embedded in a lens in an attempt to mimic traditional eyeglasses/sunglasses, as in many current wearable heads-up display, then there are restrictions on the materials that can be used, i.e., the material of the waveguide must have a higher refractive index than the refractive index of the lens. Additionally, the architecture of an optical waveguide operating under the principle of total internal reflection is constrained by the critical angle of incidence of the light on the boundaries of the waveguide. For example, when a waveguide is curved the angle of reflection of the light signals changes as the light propagates along the waveguide and it may be difficult to maintain total internal reflection. The optical devices and wearable heads-up displays described below remove these restrictions and constraints because they do not require total internal reflection to propagate light within a waveguide.

FIG. 1A is a schematic diagram of an optical waveguide 100a in accordance with the present systems, devices, and methods. Optical waveguide 100a includes a volume of optically transparent material 110a, a first holographic optical element (HOE) 120a, a second HOE 130a, and a dedicated in-coupling element 140. Volume of optically transparent material 110a has a first longitudinal surface 111a and a second longitudinal surface 112a positioned opposite one another across a width 113a of volume of optically transparent material 110a. First HOE 120a is carried on first longitudinal surface 111a, and second HOE 130a is carried on second longitudinal surface 112a. In-coupling element 140 is the in-coupling region of optical waveguide 100a and is carried on second longitudinal surface 112a. In another implementation, in-coupling element 140 may be carried on first longitudinal surface 111a. In other implementations, first HOE 120a and second HOE 130a may be carried by the volume of optically transparent material in positions that are adjacent to first longitudinal surface 111a, and second longitudinal surface 112a respectively, and in-coupling element 140 may be carried by volume of optically transparent material 110a adjacent to either first longitudinal surface 111a or second longitudinal surface 112a. That is, each of first HOE 120a, second HOE 130a, and in-coupling element 140 may be carried on the exterior of volume of optically transparent material 110a or may be embedded within volume of optically transparent material 110a adjacent to a respective longitudinal surface. First HOE 120a is shown as having the same length as first longitudinal surface 111a and second HOE 130a is shown as having greater than 80% of the length of second longitudinal surface 112a, however, in other implementations first HOE 120a and second HOE 130a may cover any portion of first longitudinal surface 111a and second longitudinal surface 112a respectively, preferably equal to or greater than 50% of each respective longitudinal surface. The designation of a HOE as the "first" or "second" HOE is only for clarity during discussion and is not meant to imply any order, such as the order of incidence of light signals thereon. Optical waveguide 100a operates as follows.

Light signals 151a (solid line arrows), 152a (dotted line arrows), and 153a (dashed line arrows) (only three light signals shown for clarity) are incident on in-coupling element 140. In-coupling element 140 in-couples light signals into waveguide 100a. That is, in-coupling element 140 re-directs light signals 151a, 152a, and 153a such that the light signals follow the "correct" path while travelling down the length of volume of optically transparent material 110a. The light signals follow a path such that the light signals are eventually output from the waveguide to fulfill the purpose of the waveguide, e.g., creating an image, signaling, etc. In-coupling element 140 may in-couple individual light signals according to the wavelength of the light signal, the angle of incidence of the light signal on in-coupling element 140, and/or the location of incidence of the light signal on in-coupling element 140. Light signals 151a, 152a, and 153a are directed towards first HOE 120a by in-coupling element 140 and reflect off of first HOE 120a towards second HOE 130a. Second HOE 130a reflects light signals 151a, 152a, and 153a back towards first HOE 120a. Lights signals 151a, 152a, and 153a continue reflecting between first HOE 120a and second HOE 130a and travel down the length of volume of optically transparent material 110a until the respective light signal is out-coupled by second HOE 130a by transmission. In FIG. 1A, the entire length of second HOE 130a is an out-coupling region for outputting light signals, however in other implementations only a sub-region of second HOE 130a may out-couple light signals. A respective light signal may be out-coupled based on the wavelength of the light signal, the location of incidence of the light signal on the out-coupling region of second HOE 130a, and/or the angle of incidence of the light signal on the out-coupling region of second HOE 130a. In FIG. 1A, light signal 151a travels further along volume of optically transparent material 110a than light signals 152a and 153a before being out-coupled by second HOE 130a, light signal 152a travels further than light signal 153a but a shorter distance then light signal 151a before being out-coupled by second HOE 130a, and light signal 153a travels a shorter distance than both light signals 151a and 152a before being out-coupled by second HOE 130a. In another implementation, optical waveguide 100a may be curved. That is, volume of optically transparent material 110a, first HOE 120a, second HOE 130a, and in-coupling element 140 may be curved. In-coupling element 140 may be a hologram, a holographic optical element, a volume diffraction grating, a surface relief grating, a transmission grating, or a reflection grating. In other implementations, the in-coupling region may be at least a portion of the first HOE or the second HOE, and the out-coupling region may be at least a portion of the first HOE or a dedicated out-coupling element. Two such implementations are shown in FIGS. 1B and 1C and are described below.

Figure 1B:
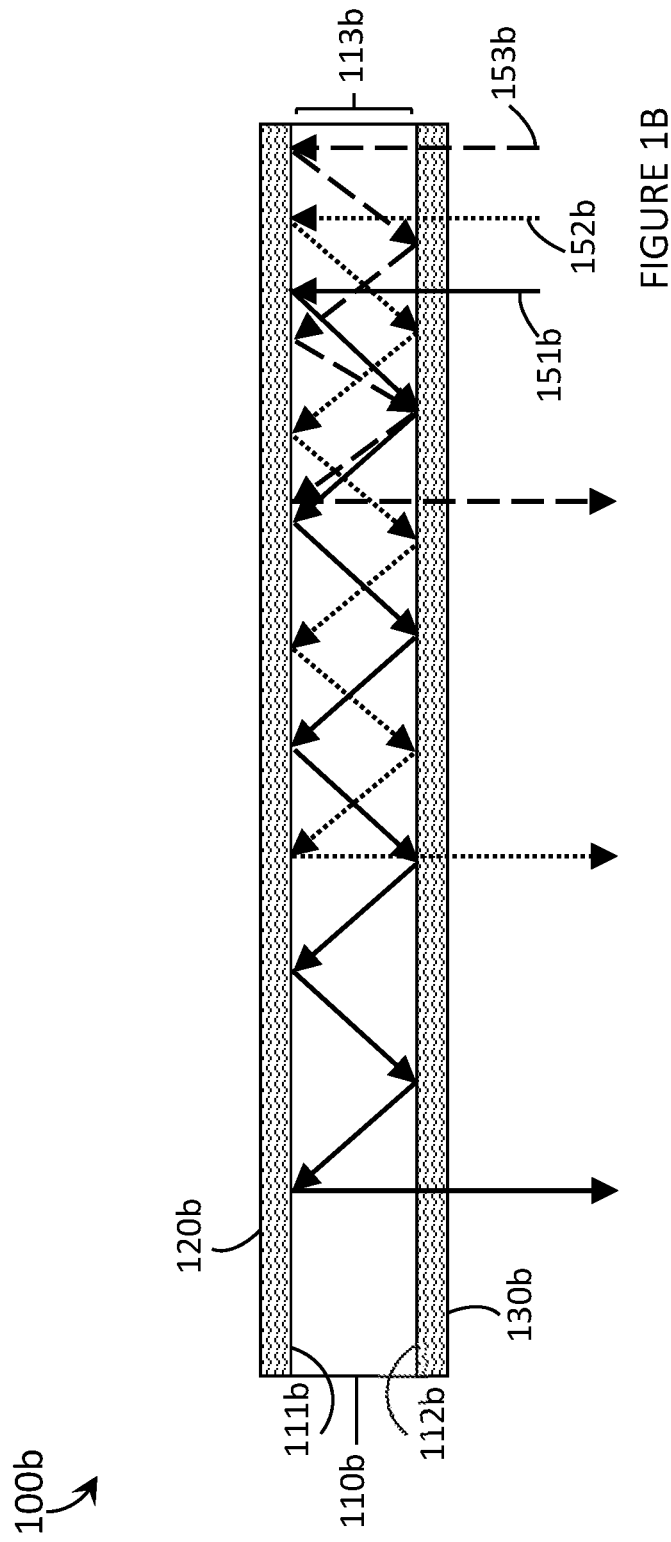
FIG. 1B is a schematic diagram of an optical waveguide in accordance with the present systems, devices, and methods.

FIG. 1B is a schematic diagram of an optical waveguide 100b in accordance with the present systems, devices, and methods. Optical waveguide 100b includes a volume of optically transparent material 110b, a first holographic optical element (HOE) 120b, and a second HOE 130b. Volume of optically transparent material 110b has a first longitudinal surface 111b and a second longitudinal surface 112b positioned opposite one another across a width 113b of volume of optically transparent material 110b. First HOE 120b is carried on first longitudinal surface 111b, and second HOE 130b is carried on second longitudinal surface 112b. In other implementations, first HOE 120b and second HOE 130b may be carried by the volume of optically transparent material in positions that are adjacent to first longitudinal surface 111b, and second longitudinal surface 112b respectively. Both an in-coupling region and an out-coupling region of optical waveguide 110b are included in first HOE 120b. First HOE 120b is shown as having the same length as first longitudinal surface 111b and second HOE 130b is shown as having the same length as second longitudinal surface 112b, however, in other implementations first HOE 120b and second HOE 130b may cover any portion of first longitudinal surface 111b and second longitudinal surface 112b respectively, preferably equal to or greater than 50% of each respective longitudinal surface. Optical waveguide 100b operates as follows.

Light signals 151b (solid line arrows), 152b (dotted line arrows), and 153b (dashed line arrows) (only three light signals shown for clarity) are incident on first HOE 120b. First HOE 120b in-couples light signals into waveguide 100b. First HOE 120b re-directs light signals 151b, 152b, and 153b such that the light signals follow the "correct" path while travelling down the length of volume of optically transparent material 110b. That is, the light signals follow a path such that the light signals are eventually output from the waveguide to fulfill the purpose of the waveguide, e.g., creating an image, signaling, etc. First HOE 120b may in-couple individual light signals according to the wavelength of the light signal, the angle of incidence of the light signal on the in-coupling region of first HOE 120b, and/or the location of incidence of the light signal on the in-coupling region of first HOE 120b. Light signals 151b, 152b, and 153b are directed towards second HOE 130b by first HOE 120b and reflect off of second HOE 130b back towards first HOE 120b. Lights signals 151b, 152b, and 153b continue reflecting between first HOE 120b and second HOE 130b and travel down the length of volume of optically transparent material 110b until the respective light signal is out-coupled by first HOE 120b by reflection. In FIG. 1B, the out-coupling region of first HOE 120b is not the entire length of first HOE 120b because a portion of first HOE 120b is the in-coupling region, however, in other implementations the entire length of first HOE 120*b* may be the out-coupling region. A respective light signal may be out-coupled based on the wavelength of the light signal, the location of incidence of the light signal on first HOE 120*b*, and/or the angle of incidence of the light signal on first HOE 120*b*. In FIG. 1B, light signal 151*b* travels further along volume of optically transparent material 110*b* than light signals 152*b* and 153*b* before being out-coupled by first HOE 120*b*, light signal 152*b* travels further than light signal 153*b* but a shorter distance then light signal 151*b* before being out-coupled by first HOE 120*b*, and light signal 153*b* travels a shorter distance than both light signals 151*b* and 152*b* before being out-coupled by first HOE 120*b*. In another implementation, optical waveguide 100*b* may be curved. That is, volume of optically transparent material 110*b*, first HOE 120*b*, and second HOE 130*b* may be curved. In other implementations, the in-coupling region may be at least a portion of the second HOE or a dedicated in-coupling element, and the out-coupling region may be at least a portion of the second HOE or a dedicated out-coupling element. A dedicated in-coupling element or a dedicated out-coupling element may be any of: a hologram, a holographic optical element, a volume diffraction grating, a surface relief grating, a transmission grating, or a reflection grating.

Figure 1C:
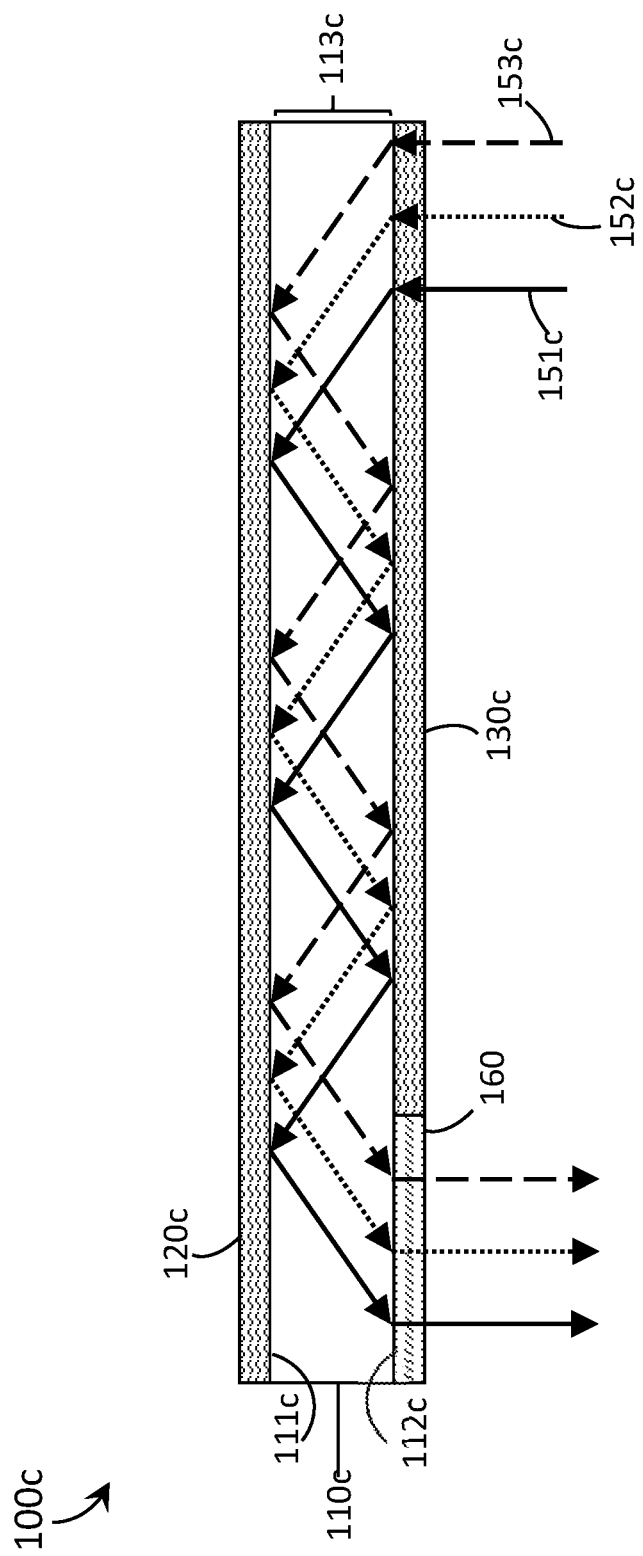
FIG. 1C is a schematic diagram of an optical waveguide in accordance with the present systems, devices, and methods.

FIG. 1C is a schematic diagram of an optical waveguide 100*c* in accordance with the present systems, devices, and methods. Optical waveguide 100*c* includes a volume of optically transparent material 110*c*, a first holographic optical element (HOE) 120*c*, a second HOE 130*c*, and a dedicated out-coupling element 160. Volume of optically transparent material 110*c* has a first longitudinal surface 111*c* and a second longitudinal surface 112*c* positioned opposite one another across a width 113*c* of volume of optically transparent material 110*c*. First HOE 120*c* is carried on first longitudinal surface 111*c*, and second HOE 130*c* is carried on second longitudinal surface 112*c*. Out-coupling element 160 is carried on second longitudinal surface 112*c*. In other implementations, first HOE 120*c* and second HOE 130*c* may be carried by the volume of optically transparent material in positions that are adjacent to first longitudinal surface 111*c*, and second longitudinal surface 112*c* respectively, and out-coupling element 160 may be carried by volume of optically transparent material 110*c* adjacent to either first longitudinal surface 111*c* or second longitudinal surface 112*a*. First HOE 120*c* is shown as having the same length as first longitudinal surface 111*c* and second HOE 130*c* is shown as having greater than 80% of the length of second longitudinal surface 112*c*, however, in other implementations first HOE 120*c* and second HOE 130*c* may cover any portion of first longitudinal surface 111*c* and second longitudinal surface 112*c* respectively, preferably equal to or greater than 50% of each respective longitudinal surface. Optical waveguide 100*c* operates as follows.

Light signals 151*c* (solid line arrows), 152*c* (dotted line arrows), and 153*c* (dashed line arrows) (only three light signals shown for clarity) are incident on second HOE 130*c*. Second HOE 130*c* in-couples light signals into waveguide 100*c*. Second HOE 130*c* re-directs light signals 151*c*, 152*c*, and 153*c* such that the light signals follow the "correct" path while travelling down the length of volume of optically transparent material 110*c*. That is, the light signals follow a path such that the light signals are eventually output from the waveguide to fulfill the purpose of the waveguide, e.g., creating an image, signaling, etc. Second HOE 130*c* may in-couple individual light signals according to the wavelength of the light signal, the angle of incidence of the light signal on second HOE 130*c*, and/or the location of incidence of the light signal on second HOE 130*c*. Light signals 151*c*, 152*c*, and 153*c* are directed towards first HOE 120*c* by second HOE 130*c* and reflect off of first HOE 120*c* back towards second HOE 130*c*. Lights signals 151*c*, 152*c*, and 153*c* continue reflecting between first HOE 120*c* and second HOE 130*c* and travel down the length of volume of optically transparent material 110*c* before being out-coupled by out-coupling element 160. Out-coupling element 160 may be a hologram, a holographic optical element, a volume diffraction grating, a surface relief grating, a transmission grating, or a reflection grating. In another implementation, optical waveguide 100*c* may be curved. That is, volume of optically transparent material 110*c*, first HOE 120*c*, second HOE 130*c*, and out-coupling element 160 may be curved. In other implementations, the in-coupling region may be at least a portion of the first HOE or a dedicated in-coupling element, and the out-coupling region may be at least a portion of the first HOE or the second HOE.

Figure 2:
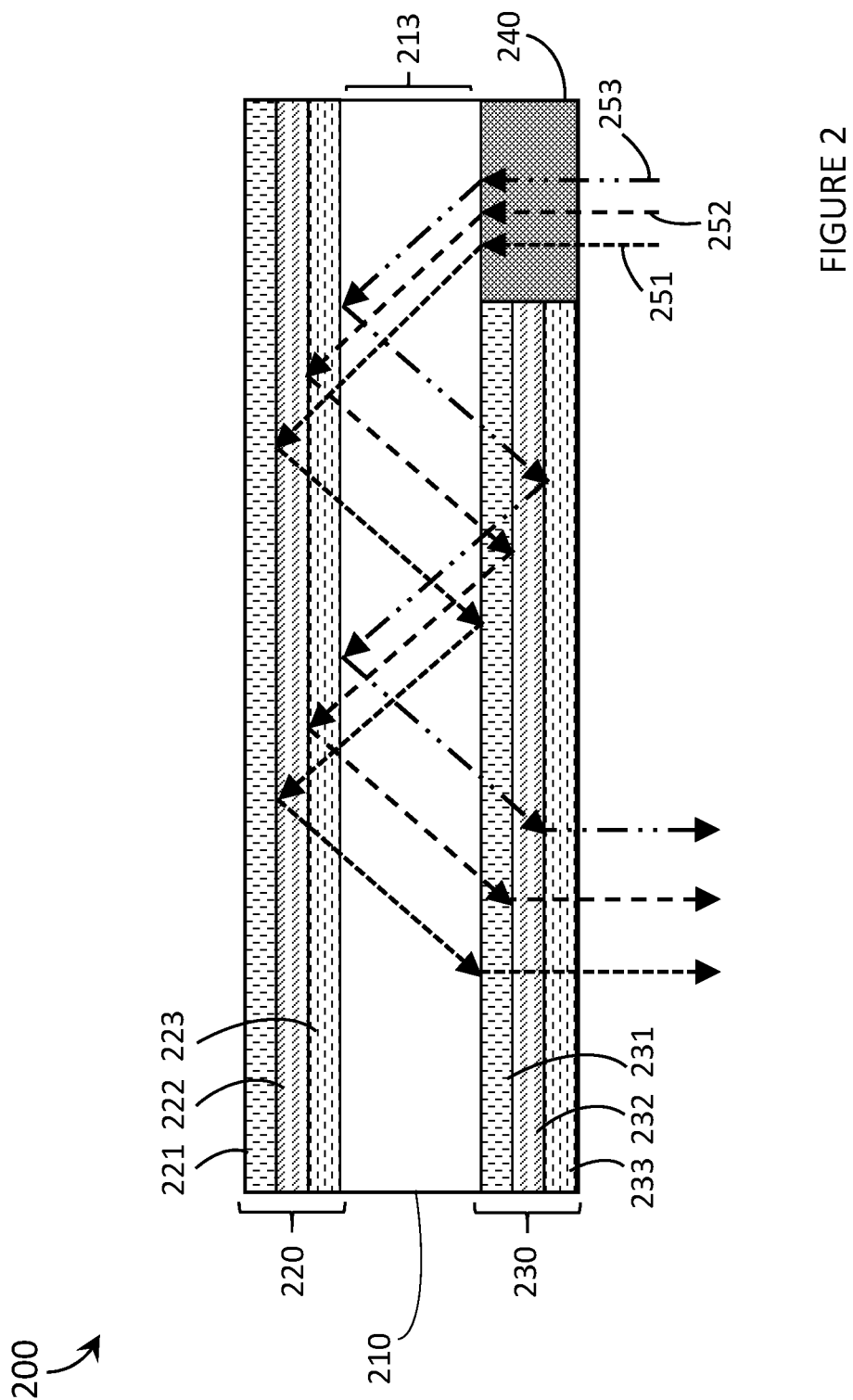
FIG. 2 is a schematic diagram of an optical waveguide having a first holographic optical element comprising multiple holograms and a second holographic optical element comprising multiple holograms in accordance with the present systems, devices, and methods.

FIG. 2 is a schematic diagram of an optical waveguide 200 having a first holographic optical element 220 comprising multiple holograms and a second holographic optical element 230 comprising multiple holograms in accordance with the present systems, devices, and methods. Optical waveguide 200 includes a volume of optically transparent material 210, first HOE 220, second HOE 230, and a dedicated in-coupling element 240. First HOE 220, second HOE 230, and in-coupling element 240 are carried by volume of optically transparent material 210. First HOE 220 is positioned opposite second HOE 230 and in-coupling element 240 across a width 213 of volume of optically transparent material 210. First HOE 220 includes a first hologram 221 responsive to light in a first waveband and unresponsive to light outside the first waveband, a second hologram 222 responsive to light in a second waveband and unresponsive to light outside the second waveband, and a third hologram 223 responsive to light in a third waveband and unresponsive to light outside the third waveband. Second HOE 230 includes a fourth hologram 231 responsive to light in the first waveband, a fifth hologram 232 responsive to light in the second waveband, and a sixth hologram responsive to light in the third waveband. The first waveband, second waveband, and third waveband are distinct and non-overlapping. In FIG. 2, holograms 221, 222, and 223 are drawn as separate layers of holographic substrate (e.g., photopolymer, holographic film, etc.) within first HOE 220 and holograms 231, 232, and 232 are drawn as separate layers of holographic substrate within second HOE 230. In other implementations, first HOE 220 and second 230 may each include N holograms (where N is any integer greater than 1) wherein each respective hologram of first HOE 220 is responsive to light in a distinct waveband and wherein each respective hologram of first HOE 220 is responsive to light in the same waveband as a respective hologram of second HOE 230. Multiple holograms may be recorded in a single layer of holographic substrate, or any number of holograms may be recorded in any number of layers of holographic substrate provided each layer of holographic substrate is recorded with at least one hologram. In other implementations, the wavebands of each hologram of a HOE may not be distinct or non-overlapping. In other implementations, each hologram of first HOE 220 may not be responsive to light in the same waveband as a respective hologram of second HOE 230 and the first HOE and the second HOE may have a different number of holograms. Optical waveguide 200 operates as follows.

Light signals 251, 252, and 253 are incident on in-coupling element 240. Light signal 251 (small dashed line arrows) has a wavelength in the first waveband. Light signal 252 (medium dashed line arrows) has a wavelength in the second waveband. Light signal 253 (dash and two dots arrows) has a wavelength in the third waveband. In-coupling element 240 in-couples the light such that each light signal is directed on the desired path down the length of the optical waveguide. Individual light signals may be in-coupled according to the wavelength of the light signal, the angle of incidence of the light signal on the in-coupling element, and/or the location of incidence of the light signal on the in-coupling element. In-coupling element 240 may be a hologram, a holographic optical element, a volume diffraction grating, a surface relief grating, a transmission grating, or a reflection grating. Light signal 251 is directed towards hologram 221 by in-coupling element 240. Light signal 251 travels down the length of volume of optically transparent material 210 by reflection between hologram 221 and hologram 231. Light signal 251 is out-coupled by hologram 231. Light signal 252 is directed towards hologram 222 by in-coupling element 240. Light signal 252 travels down the length of volume of optically transparent material 210 by reflection between hologram 222 and hologram 232. Light signal 252 is out-coupled by hologram 232. Light signal 253 is directed towards hologram 223 by in-coupling element 240. Light signal 253 travels down the length of volume of optically transparent material 210 by reflection between hologram 223 and hologram 233. Light signal 253 is out-coupled by hologram 233. The first waveband may comprise light of red wavelengths, the second waveband may comprise light of green wavelengths, and the third waveband may comprise light of blue wavelengths. In another implementation, lights signal 251, light signal 252, and light signal 253 may be out-coupled by a dedicated out-coupling element which may be a hologram, a holographic optical element, a volume diffraction grating, a surface relief grating, a transmission grating, or a reflection grating.

Figure 3:
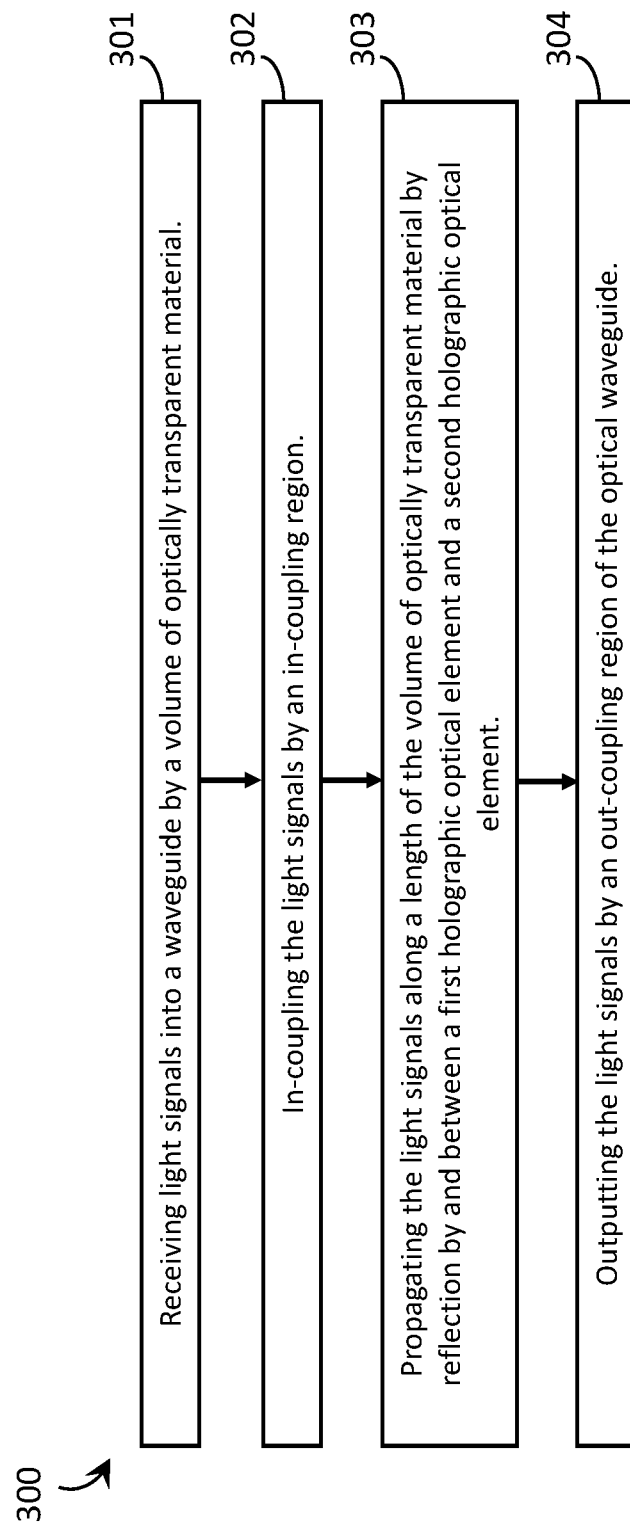
FIG. 3 is a flow diagram of a method of operating an optical waveguide in accordance with the present systems, devices, and methods.

FIG. 3 is a flow diagram of a method 300 of operating an optical waveguide in accordance with the present systems, devices, and methods. The optical device of FIG. 3 may be similar to optical waveguide 100a, optical waveguide 110b, optical waveguide 110c, and optical waveguide 200 or any other optical waveguide implementations described above. The optical waveguide of FIG. 3 generally includes a volume of optically transparent material having a first longitudinal surface and a second longitudinal surface, a first HOE carried by the volume of optically transparent material at or adjacent the first longitudinal surface, and a second HOE carried by the volume of optically transparent material at or adjacent the second longitudinal surface, wherein the second longitudinal surface is positioned opposite the first longitudinal surface across a width of the volume of optically transparent material. Method 300 includes acts 301, 302, 303, and 304 though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 301, light signals are received by the waveguide. The light signals may pass directly into the volume of optically transparent material or may pass through the first HOE or the second HOE before entering the volume of optically transparent material.

At 302, light signals are in-coupled by an in-coupling region. That is, individuals light signals may be redirected by an in-coupling region to ensure they are propagated down the length of the waveguide on the correct path. In one implementation, the in-coupling region may be at least a portion of the respective HOE through which light is transmitted as it enters the volume of optically transparent material. In another implementation, the waveguide may include a dedicated in-coupling element carried on or adjacent either the first longitudinal surface or the second longitudinal surface through which light passes to enter the volume of optically transparent material. The dedicated in-coupling element may be a hologram, a holographic optical element, a volume diffraction grating, a surface relief grating, a transmission grating, or a reflection grating. Alternatively, the light may pass into the volume of optically transparent material directly or through the first HOE or the second HOE and then in-coupling may occur upon incidence on and reflection of the light signals from an in-coupling region. In such an implementation the in-coupling region could be on the first HOE, the second HOE, or a dedicated in-coupling element, depending on the architecture of the optical waveguide.

At 303, the light signals are propagated down the length of the volume of optically transparent material by reflection by and between the first HOE and the second HOE.

At 304, the light signals are output by the waveguide. The output of the light signals may be facilitated by an out-coupling region. The out-coupling region may be on the first HOE, the second HOE, or a dedicated out-coupling element. In an implementation with a dedicated out-coupling element, the dedicated out-coupling element may be carried on or adjacent the first longitudinal surface or the second longitudinal surface of the volume of optically transparent material. The dedicated out-coupling element may be a hologram, a holographic optical element, a volume diffraction grating, a surface relief grating, a transmission grating, or a reflection grating. In an implementation where the out-coupling region is present on a HOE light signals may be out-coupled by transmission or reflection. Individual light signals may be output from the waveguide according to the wavelength of the light signal, the angle of incidence of the light signal on the out-coupling region, and/or the location of incidence of the light signal on the out-coupling region.

Figure 4:
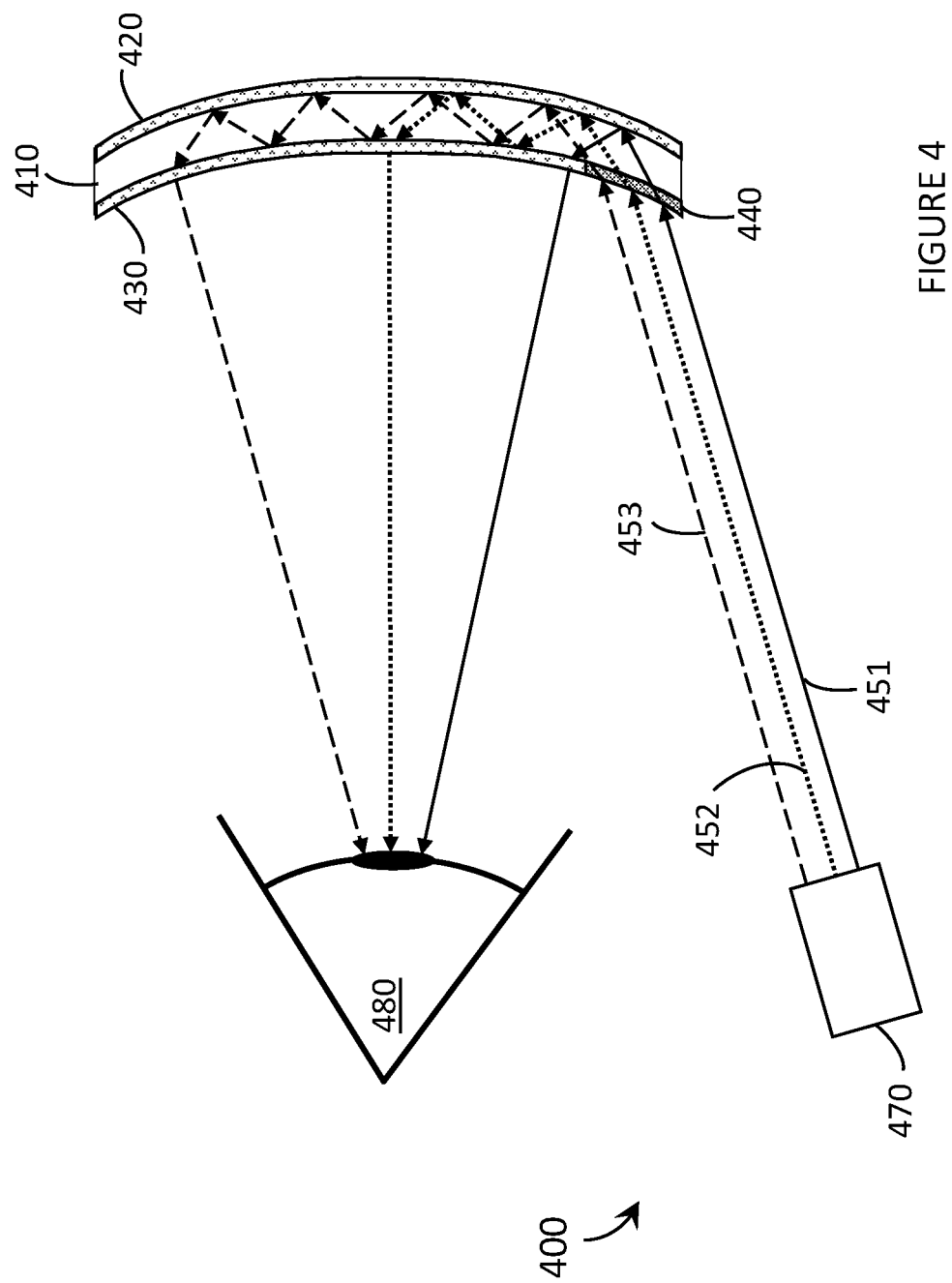
FIG. 4 is a schematic diagram of a wearable heads-up display with an optical waveguide in accordance with the present systems, devices, and methods.

FIG. 4 is a schematic diagram of a wearable heads-up display (WHUD) 400 with an optical waveguide in accordance with the present systems, devices, and methods. WHUD 400 includes a projector 470 and an optical waveguide comprising a volume of optically transparent material 410 carrying a first HOE 420, a second HOE 430, and a dedicated in-coupling element 440. First HOE 420 is positioned opposite to second HOE 430 across a width of the volume of optically transparent material. WHUD 400 operates as follows.

Projector 470 generates light signal 451 (solid line arrows), light signal 452 (dotted line arrows), and light signal 453 (dashed line arrows). Light signals 451, 452, and 453 may be representative of any number of light signals with only three light signals being shown for clarity. Projector 470 includes at least one light source. The at least one light source may include at least one laser diode. Projector 470 may include a controllable mirror to direct or scan the light signals towards the optical waveguide. Projector 470 may include structures or components to modulate the light signals, such as a selective light modulator (SLM) or a liquid crystal element. Projector 470 may include a processor and a non-transitory processor-readable storage medium wherein the processor is communicatively coupled to the at least one light source and the processor executes data and/or instructions from the non-transitory processor-readable storage medium to modulate the output of light signals by the at least one light source. Light signals 451, 452, and 453 are incident on in-coupling element 440 and are in-coupled by in-coupling element 440 into the volume of optically transparent material of the optical waveguide. In-coupling element 440 may be a hologram, a holographic optical element, a volume diffraction grating, a surface relief grating, a transmission grating, or a reflection grating. Light signals 451, 452, and 453 are reflected by first HOE 420 towards second HOE 430. Light signal 451 is incident on second HOE 430 and is out-coupled by second HOE 430. Light signal 452 reflects between first HOE 420 and second HOE 430 and travels further down the length of volume of optically transparent material 410 than light signal 451 before being out-coupled by second HOE 430. Light signal 453 reflects between first HOE 420 and second HOE 430 and travels further down the length of volume of optically transparent material 410 than both light signal 451 and light signal 452 before being out-coupled by second HOE 430. Out-coupled light signals 451, 452, and 453 converge towards and are incident on the pupil of an eye 480 of the user. In-coupling of light signals 451, 452, and 453 directs light signals 451, 452, and 453 on a path along volume of optically transparent material 410 that enables out-coupling such that light signals 451, 452, and 453 are incident on eye 480 to create a desired pattern or image. In other implementations, the optical waveguide may not have a dedicated in-coupling element and at least a portion of first HOE 420 or second HOE 430 may be an in-coupling region. As well, the out-coupling region may be at least a portion of first HOE 420 or a dedicated out-coupling element. A dedicated out-coupling element may be a hologram, a holographic optical element, a volume diffraction grating, a surface relief grating, a transmission grating, or a reflection grating. In-coupling element 440 may be carried by volume of optically transparent material 410 and may be positioned on the same side of volume of optically transparent material 410 as either first HOE 420 or second HOE 430. In-coupling element 440 may also be carried by projector 470 or by a support structure of WHUD 400. A dedicated out-coupling element would be carried by a volume of optically transparent material 410 and may be positioned on the same side of the volume of optically transparent material 410 as first HOE 420 or second HOE 430. Light signals 451, 452, and 453 may be out-coupled according to the wavelength of the light signal, the angle of incidence of the light signals on second HOE 430, and the location of incidence of the light signals on second HOE 430. First HOE 420 and second HOE 430 may be comprised of multiple holograms wherein first HOE 420 and second HOE 430 are responsive to light in the same wavebands. When multiple holograms comprise first HOE 420 and second HOE 430, the individual holograms may be responsive to light in distinct and non-overlapping wavebands, or distinct wavebands which overlap, or multiple holograms may be responsive to light in the same waveband.

Figure 5:
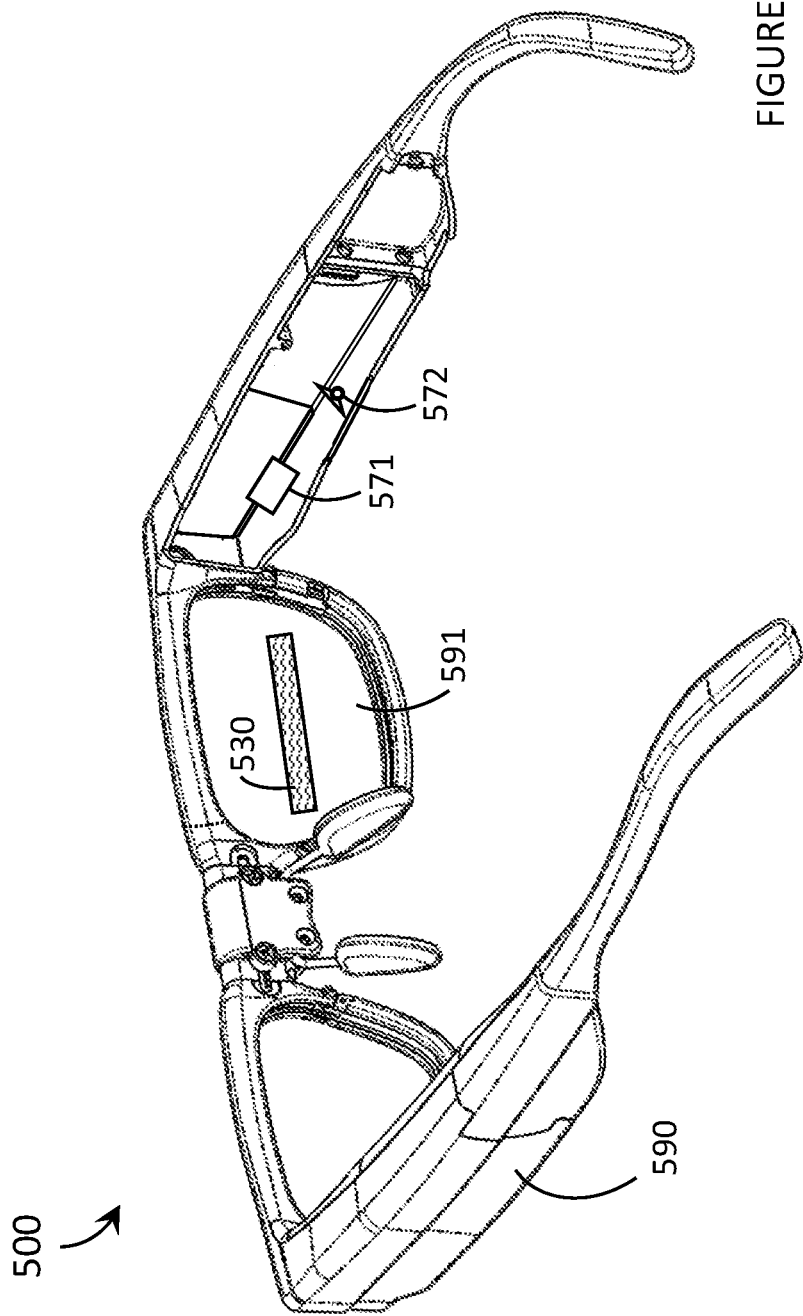
FIG. 5 is an isometric view of a wearable heads-up display with an optical waveguide in accordance with the present systems, devices, and methods.

FIG. 5 is an isometric view of a wearable heads-up display 500 with an optical waveguide in accordance with the present systems, devices, and methods. WHUD 500 includes support structure 590, an eyeglass lens 591 carried by the support structure, a projector carried by the support structure and including a light source 571 and a controllable mirror 572, and an optical waveguide carried by the eyeglass lens and including a volume of optically transparent material (not shown), a first HOE (not shown), and a second HOE 530. Support structure 590 has the shape and appearance of eyeglasses. The optical waveguide may be carried on a surface of eyeglass lens 591 or may be carried within (e.g. embedded in) in eyeglass lens 591. The volume of optically transparent material may be separate from eyeglass lens 591 or may be the eyeglass lens. That is the first HOE and second HOE 530 may be carried within (e.g. embedded in) the eyeglass lens 591 and the volume of optically transparent material may be the volume of eyeglass lens 591 across which the first HOE and second HOE 530 are positioned. The first HOE and second HOE 530 may span the entire length of the volume of optically transparent material or the first HOE and second HOE 530 may span only an active region of the volume of optically transparent material. That is, the length of the volume of optically transparent material may be greater than the length of the region of the volume of optically transparent material in which light signals may be present. Eyeglass lens 591 may be a curved prescription lens and the optical waveguide may be curved to apply the same prescription as eyeglass lens 591. WHUD 500 operates as follows.

Light source 571 generates light signals and directs them towards controllable mirror 572. Light source 571 may be at least one laser diode. The projector may include a processor and a non-transitory processor-readable storage medium wherein the processor is communicatively coupled to the light source and the processor executes data and/or instructions from the non-transitory processor-readable storage medium to modulate the output of light signals by the light source. Controllable mirror 572 redirects the light signals towards the optical waveguide. In FIG. 5, the optical waveguide is embedded within eyeglass lens 591. Therefore, the light signals are directed through the eyeglass lens and through second HOE 530 before entering the volume of optically transparent material. The light signals are in-coupled into the volume of optically transparent material of the waveguide by second HOE 530. The light signals travel along the length of the volume of optically transparent material by reflection by and between the first HOE and second HOE 530. Individual light signals are out-coupled by second HOE 530. The individual light signals may be out-coupled by second HOE 530 according to the wavelength of the light signal, the angle of incidence of the light signal on second HOE 530, and/or the location of incidence of the light signal on second HOE 530. The out-coupled light signals are incident on an eye of a user when the support structure is worn on the head of the user. In-coupling of the light signals may be performed by at least a portion of the first HOE or a dedicated in-coupling element instead of the second HOE. The dedicated in-coupling element may be a hologram, a holographic optical element, a volume diffraction grating, a surface relief grating, a transmission grating, or a reflection grating, and may be carried by the optical waveguide or may be carried elsewhere on support structure 590. Out-coupling may be performed by at least a portion of the first HOE or at least a portion of a dedicated out-coupling element carried by the volume of optically transparent material. The dedicated out-coupling may be a hologram, a holographic optical element, a volume diffraction grating, a surface relief grating, a transmission grating, or a reflection grating. WHUD 500 is shown with a single optical waveguide, however, in other implementations, multiple optical waveguides may be employed to create the desired image or pattern of light at the eye of the user. The eyeglass lens and optical waveguide, including the first HOE, second HOE 530, dedicated in-coupling element, and dedicated out-coupling element, may be curved to apply a prescription to WHUD 500. The first HOE and second HOE 530 may comprise multiple holograms as discussed above.

Figure 6:
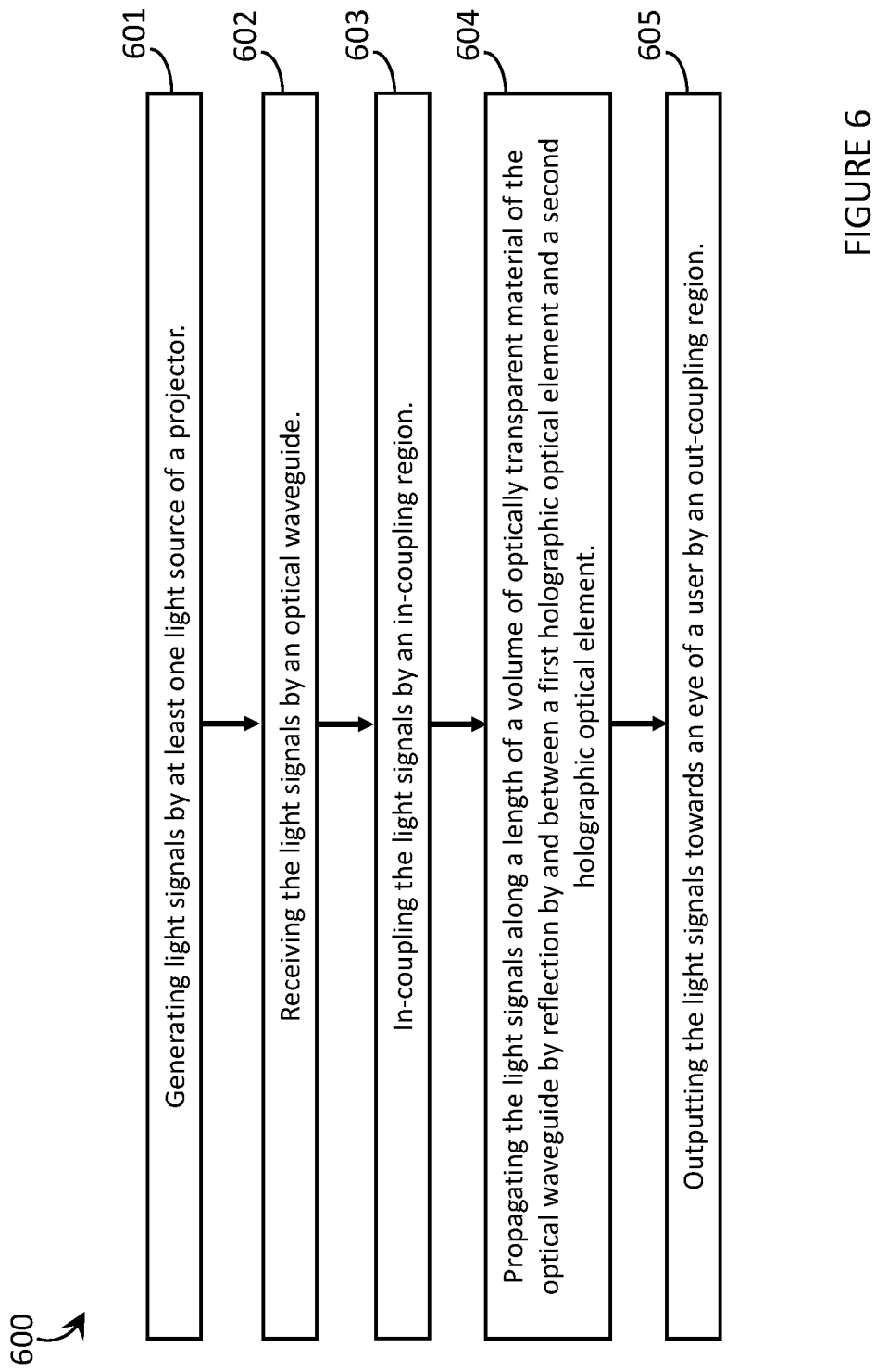
FIG. 6 is a flow diagram of a method of operating a wearable heads-up display with an optical waveguide in accordance with the present systems devices and methods.

FIG. 6 is a flow diagram of a method 600 of operating a wearable heads-up display with an optical waveguide in accordance with the present systems, devices, and methods. The wearable heads-up display may be similar to WHUD 500 of FIG. 5. The optical waveguide may be similar to optical waveguides 100a, 100b, 100c, and 200, and the optical waveguides of WHUD 400 and WHUD 500. The WHUD of FIG. 6 includes a support structure worn on the head of a user, a projector carried by the support structure and including at least one light source, and an optical waveguide carried by the support structure and positioned in the field of view of the user when the support structure is worn on the head of the user. The optical waveguide includes a volume of optically transparent material, a first HOE carried by the volume of optically transparent material and a second HOE carried by the volume of optically transparent material. Method 600 includes acts 601, 602, 603, and 604, thought those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 601, light signals are generated by the at least one light source of the projector. The projector may include a processor and a non-transitory processor-readable storage medium wherein the processor executes data and/or instructions from the non-transitory processor-readable storage medium to modulate the output of light signals by the light source.

At 602, light signals are received by the waveguide. The light signals may pass into the waveguide directly through the volume of optically transparent material or may pass through the first HOE or the second HOE before entering the volume of optically transparent material.

At 603, the light signals are in-coupled by an in-coupling region. That is, individuals light signals may be redirected by an in-coupling region to ensure they are propagated down the length of the waveguide on the correct path. In one implementation, the in-coupling may be at least a portion of the respective HOE through which light is transmitted as the light enters the volume of optically transparent material. In another implementation, the waveguide may include a dedicated in-coupling element carried on the volume of optically transparent material which couples light into the volume of optically transparent material. The dedicated in-coupling element may be a hologram, a holographic optical element, a volume diffraction grating, a surface relief grating, a transmission grating, or a reflection grating. Individual light signals may be in-coupled according to the wavelength of the light signal, the angle of incidence of the light signal on the in-coupling region, and/or the location of incidence of the light signal on the in-coupling region. Alternatively, the light may pass into the volume of optically transparent material directly or through the first HOE or the second HOE into the volume of optically transparent material and then in-coupling may occur upon incidence on and reflection of the light signals from an in-coupling region. In such an implementation, the in-coupling region could be at least a portion of the first HOE, the second HOE, or a dedicated in-coupling element, depending on the architecture of the optical waveguide. In another implementation, an in-coupling element having an in-coupling region could be carried by the projector or the support structure and the light signals could be in-coupled before incidence on the optical waveguide. The light signals may be directed towards the waveguide from the projector by a controllable mirror.

At 604, the light signals are propagated down a length of the volume of optically transparent material by reflection by and between the first HOE and the second HOE.

At 605, the light signals are output by the waveguide towards an eye of the user. The output of the light signals may be facilitated by an out-coupling region. The out-coupling region may be at least a portion of the first HOE, the second HOE, or a dedicated out-coupling element. In an implementation with a dedicated out-coupling element, the dedicated out-coupling element is carried by the volume of optically transparent material. The dedicated out-coupling element may be a hologram (reflection or transmission), a holographic optical element, a volume diffraction grating, a surface relief grating, a transmission grating, or a reflection grating. Individual light signals may be output from the waveguide according to the wavelength of the light signal, the angle of incidence of the light signal on the out-coupling region, and/or the location of incidence of the light signal on the out-coupling region. The light signals are output from the waveguide such that they create a desired image or pattern at the eye of the user. The WHUD may include an eyeglass lens carried by the support structure wherein the waveguide is carried by the eyeglass lens. The eyeglass lens may be a curved prescription eyeglass lens and the optical waveguide, including the first HOE, the second HOE, and dedicated in-coupling or out-coupling elements may be curved to match the prescription of the eyeglass lens.

In some implementations, a waveguide may terminate at the out-coupling optical grating because there is no desire to propagate light within the waveguide beyond that point. However, this can result in a visible seam within or upon the eyeglass lens where the waveguide ends. In order to avoid this seam, in some implementations, a waveguide may be extended beyond the out-coupling optical grating to the far edge of an eyeglass lens even though there is no intention to propagate light within the waveguide beyond the out-coupling optical grating.

In some implementations, a refractive index barrier (i.e., a material having an intermediate refractive index) may be employed in between an optical grating and any lens/waveguide material in order to enable light to couple between the optical grating and the lens/waveguide material.

Some of the waveguides or optical gratings described herein (particularly those that employ curvature) may introduce optical distortions in displayed images. In accordance with the present systems, devices, and methods, such optical distortions may be corrected (i.e., compensated for) in the software that drives the display engine.

The relative positions of waveguides within lenses shown herein are used for illustrative purposes only. In some implementations, it may be advantageous for a waveguide to be positioned centrally, whereas in other implementations it may be advantageous for a waveguide to be positioned off-center. In particular, it may be advantageous for a waveguide to couple to the corner of the support structure/eyeglasses frame where the temple of the eyeglasses frame meets the rims, because this is an advantageous location to route display light from a scanning laser projector or microdisplay with minimal impact on form factor.

The various embodiments described herein generally reference and illustrate a single eye of a user (i.e., monocular applications), but a person of skill in the art will readily appreciate that the present systems, devices, and methods may be duplicated in a WHUD in order to provide scanned laser projection and scanned laser eye tracking for both eyes of the user (i.e., binocular applications).

The WHUDs described herein may include one or more sensor(s) (e.g., microphone, camera, thermometer, compass, and/or others) for collecting data from the user's environment. For example, one or more camera(s) may be used to provide feedback to the processor of the wearable heads-up display and influence where on the transparent display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Provisional Patent Application Ser. No. 62/525,601, US Patent Application Publication No. US 2015-0378161 A1, US Patent Application Publication No. 2016-0377866 A1 U.S. Non-Provisional patent application Ser. No. 15/046,234, U.S. Non-Provisional patent application Ser. No. 15/046,254, US Patent Application Publication No. US 2016-0238845 A1, U.S. Non-Provisional patent application Ser. No. 15/145,576, U.S. Non-Provisional patent application Ser. No. 15/145,609, U.S. Non-Provisional patent application Ser. No. 15/147,638, U.S. Non-Provisional patent application Ser. No. 15/145,583, U.S. Non-Provisional patent application Ser. No. 15/256,148, U.S. Non-Provisional patent application Ser. No. 15/167,458, U.S. Non-Provisional patent application Ser. No. 15/167,472, U.S. Non-Provisional patent application Ser. No. 15/167,484, U.S. Provisional Patent Application Ser. No. 62/271,135, U.S. Non-Provisional patent application Ser. No. 15/331,204, US Patent Application Publication No. US 2014-0198034 A1, US Patent Application Publication No. US 2014-0198035 A1, U.S. Non-Provisional patent application Ser. No. 15/282,535, U.S. Provisional Patent Application Ser. No. 62/268,892, U.S. Provisional Patent Application Ser. No. 62/322,128, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display (WHUD) comprising:
a support structure that in use is worn on a head of a user, the support structure having a shape and appearance of an eyeglass frame;
a projector to generate light signals, the projector comprising at least one light source; and
an optical waveguide comprising:
a volume of optically transparent material;
a first holographic optical element ("HOE") carried by the volume of optically transparent material;
a second HOE carried by the volume of optically transparent material and positioned opposite the first HOE across a width of the volume of optically transparent material, wherein light signals from the projector that enter the volume of optically transparent material are sequentially reflected at least twice by and between the first HOE and the second HOE to propagate along a length of the optical waveguide;
an in-coupling region; and
an out-coupling region.

2. The WHUD of claim 1 wherein the first HOE and the second HOE both span the length of the volume of optically transparent material.

3. The WHUD of claim 1 wherein the first HOE and the second HOE both span an active region of the volume of optically transparent material.

4. The WHUD of claim 1 wherein the volume of optically transparent material is curved.

5. The WHUD of claim 4 wherein the first HOE and the second HOE are both curved.

6. The WHUD of claim 1 further including an eyeglass lens carried by the support structure.

7. The WHUD of claim 6 wherein the optical waveguide is carried by the eyeglass lens.

8. The WHUD of claim 6 wherein the eyeglass lens is a curved prescription eyeglass lens.

9. The WHUD of claim 8 wherein the optical waveguide is carried by the curved prescription eyeglass lens and wherein a curvature of the optical waveguide corresponds to a prescription curvature of the curved prescription eyeglass lens.

10. The WHUD of claim 1 wherein the volume of optically transparent material has a shape and appearance of an eyeglass lens and is carried by the support structure.

11. The WHUD of claim 1 wherein the in-coupling region includes at least a portion of an element selected from a group consisting of: the first HOE, the second HOE, and a dedicated in-coupling element.

12. The WHUD of claim 11 wherein the in-coupling region includes a dedicated in-coupling element selected from a group consisting of: a hologram, a holographic optical element, a volume diffraction grating, a surface relief diffraction grating, a transmission grating, and a reflection grating.

13. The WHUD of claim 11 wherein light signals are in-coupled according to at least one property selected from a group consisting of: a wavelength of a light signal, an angle of incidence of a light signal on the in-coupling region, and a location of incidence of a light signal on the in-coupling region.

14. The WHUD of claim 11 wherein the projector further includes a controllable mirror to controllably direct the light signals towards the optical waveguide.

15. The WHUD of claim 1 wherein the out-coupling region includes at least a portion of an element selected from a group consisting of: the first HOE, the second HOE, and a dedicated out-coupling element.

16. The WHUD of claim 15 wherein the out-coupling region includes a dedicated out-coupling element selected from a group consisting of: a hologram, a holographic optical element, a volume diffraction grating, a surface relief diffraction grating, a transmission grating, and a reflection grating.

17. The WHUD of claim 15 wherein light signals are out-coupled according to at least one property selected from a group consisting of: a wavelength of a light signal, an angle of incidence of a light signal on the out-coupling region, and a location of incidence of a light signal on the out-coupling region.

18. The WHUD of claim 1 wherein the light source includes at least one laser diode.

19. A wearable heads-up display (WHUD) comprising:
a support structure that in use is worn on a head of a user, the support structure having a shape and appearance of an eyeglass frame;
a projector to generate light signals, the projector comprising at least one light source; and
an optical waveguide comprising:
a volume of optically transparent material;
a first holographic optical element ("HOE") carried by the volume of optically transparent material;
a second HOE carried by the volume of optically transparent material and positioned opposite the first HOE across a width of the volume of optically transparent material, wherein light signals from the projector that enter the volume of optically transparent material are sequentially reflected at least twice by and between the first HOE and the second HOE to propagate along a length of the optical waveguide;
an in-coupling region; and
an out-coupling region;
wherein the first HOE comprises N holograms, where N is an integer greater than 1 and wherein each of the N holograms in the first HOE is responsive to light in a respective one of N distinct wavebands; and
wherein the second HOE comprises N holograms, wherein each of the N holograms in the second HOE is responsive to light in a respective one of the N distinct wavebands.

20. A wearable heads-up display (WHUD) comprising:
a support structure that in use is worn on a head of a user, the support structure having a shape and appearance of an eyeglass frame;
a projector to generate light signals, the projector comprising at least one light source; and
an optical waveguide comprising:
a volume of optically transparent material;
a first holographic optical element ("HOE") carried by the volume of optically transparent material;
a second HOE carried by the volume of optically transparent material and positioned opposite the first HOE across a width of the volume of optically transparent material, wherein light signals from the projector that enter the volume of optically transparent material are sequentially reflected at least twice by and between the first HOE and the second HOE to propagate along a length of the optical waveguide;
an in-coupling region; and
an out-coupling region;
wherein the first HOE comprises:
  a first hologram responsive to light in a first waveband and unresponsive to light outside the first waveband;
  a second hologram responsive to light in a second waveband and unresponsive to light outside the second waveband; and
  a third hologram responsive to light in a third waveband and unresponsive to light outside the third waveband, wherein the first waveband, the second waveband, and the third waveband are all distinct and non-overlapping; and
wherein the second HOE comprises:
  a fourth hologram responsive to light in the first waveband and unresponsive to light outside the first waveband;
  a fifth hologram responsive to light in the second waveband and unresponsive to light outside the second waveband; and
  a sixth hologram responsive to light in the third waveband and unresponsive to light outside the third waveband.

\* \* \* \* \*